Dec. 27, 1932.    E. LÄSSER    1,892,621
GEAR CUTTING MACHINE
Filed Oct. 27, 1930
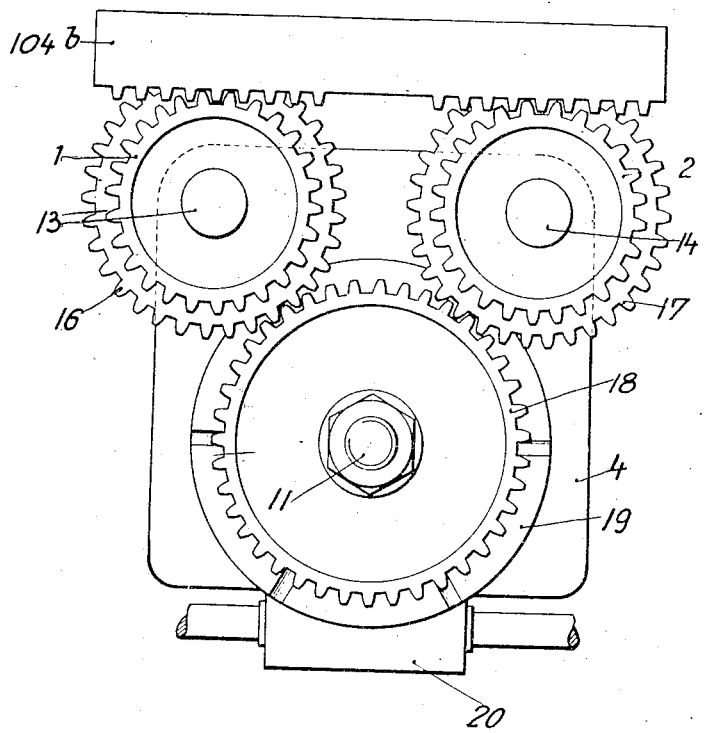
Inventor
Emil Lässer
By
Attorney Patented Dec. 27, 1932

1,892,621

UNITED STATES PATENT OFFICE

EMIL LÄSSER, OF ZURICH, SWITZERLAND, ASSIGNOR TO MAAG GEAR-WHEEL AND MACHINE COMPANY LTD., OF ZURICH, SWITZERLAND

GEAR CUTTING MACHINE

Application filed October 27, 1930, Serial No. 491,595, and in Germany October 31, 1929.

My invention relates to improvements in gear-cutting machines having a cutter of a straight toothed profile which operates on the blank on what is known as the rolling principle, that is to say, the blank and the rack-profiled cutter are given a relative motion resembling that of a pinion which engages and rolls along a rack. Owing to this relative motion, the rack-profiled cutter will generate teeth on the blank having accurately the desired profile.

Broadly speaking, two kinds of machines of this character are in extensive use, one type having a reciprocating shaping tool and the other type having a rotary cutter. More particularly, my invention relates to the former type, although it is applicable to the latter.

The primary object of my invention is to increase the output of the machine by a simple equipment which is inexpensive and reliable in operation. For this purpose, I provide the machine with two or more rotary work supports, the axes of which are arranged in parallel disposition and, preferably, at equal distances from the shaping profile of the cutter, each support being adapted to receive one or more blanks in axial alignment and to present them to the cutter. Means are provided for imparting to the supports a synchronous and identic rolling motion relative to the cutter so that, as a result, the cutter machines the blanks on the various supports at the same time in one operation.

The tool may comprise one shaping tool which is sufficiently long to extend within reach of all of the supports or, alternatively, may be composed of a number of shaping tools each co-ordinated to one support, which are so fixed in a single tool holder as to constitute a unitary rectilinear toothed cutter.

For a better understanding of my invention, I shall describe hereinafter a preferred embodiment as applied to the shaping machine shown and described in the re-issue Patent No. 14,908 to Maag, issued July 6, 1920. I wish it to be understood, however, that my invention is in no way limited to the particular type of machine and its construction shown in said patent.

For sake of simplicity, the accompanying drawing illustrates the supplemental equipment only which I have added to the machine invented by Maag. For a complete understanding of the entire machine reference may be had to said re-issue patent which is to be considered part of the present disclosure.

The drawing is a plan view of my novel equipment. The reciprocatory rack-profiled planing tool is designated by $104b$ and is mounted in the machine in a similar manner as the planing tool $104a$, shown in Figs. 1 and 2 of the mentioned re-issue patent. It differs from the planing tool $104a$ solely by its increased length which substantially corresponds to the length of the cross-slide 4 of Maag's construction. The shaft 11 indicates the vertical mandrel of the rotary table 19 shown in the re-issue patent and is adapted to be turned by a worm 20 engaging a worm-wheel rim on the table.

For the purposes of my present invention, I have attached to the cross-slide 4 two vertical mandrels 13 and 14 in the positions shown in the drawing. Each of these mandrels or pivots 13 and 14 receives a work support in form of a pinion 16, or 17 respectively, which is adapted to be clutched to a blank 1, or 2 respectively, imposed thereon. If desired, a number of blanks may be stacked one upon the other on each of the mandrels 13 or 14, the number of them depending on the stroke of the cutter $104b$ as will easily be understood.

In the embodiment shown, the required rotary movement is imparted to the work supports 16 and 17 by a gear 18 attached to the table 19 and arranged in engagement with the teeth of the supports 16 and 17.

It will be appreciated, however, that the blanks on the mandrels 13 and 14 may be rotated directly by any suitable means. It is necessary, however, that they perform a synchronous and identic motion relative to the cutter.

The length of the shaping tool $104b$ depends on the diameter of the gear wheels to be cut and on the number of work supports arranged in front of it. While in the embodiment shown an integral member $104b$ serves as the shaping tool, it will be appreciated that two or more comparatively short shaping tools may be clamped in juxtaposition in the same tool holder so as to constitute a unitary rectilinear cutter.

In the embodiment shown, the mandrel 11 may be employed alone for cutting large gears in the manner shown in the mentioned re-issue patent in which case the mandrels 13 and 14 would be disassembled and removed and a suitable cutter be employed having teeth along the section which is opposite to the shaft or mandrel 11.

From the foregoing it will be apparent, that the work capacity of the machine for manufacturing comparatively small gear wheels is duplicated by an inexpensive equipment which may easily be attached to existing machines.

Instead of two work supports 13 and 14, a larger number of them may be employed with advantage if very small wheels are to be provided with teeth.

As the direction of rotation of the work supports 16 and 17 is opposite to that of the table 19 it is necessary to reverse the latter when attaching the described equipment. I may effect such reversal by suitably exchanging the worm and the worm gear.

What I claim is:—

1. Cutting machine for the manufacture of gear wheels operating on the rolling principle which comprises a unitary rectilinear toothed cutter, a main driving spindle, a plurality of auxiliary rotary work supports arranged in parallel disposition and at equal distances from said cutter and each adapted to support at least one blank to be toothed in tangential relationship to said cutter, driving means for causing said supports to perform a synchronous and identic motion relative to said cutter, whereby said blanks are machined simultaneously, said means including a pinion on each of said supports adapted to be clutched to a blank and a gear wheel mounted on said main driving spindle and arranged in mesh with said pinions, said main driving spindle being spaced at a greater distance from said cutter than said pinions whereby said main driving spindle may be used as a support when cutting the teeth on a blank of large diameter.

2. A blank carrier comprising a base portion, a plurality of shafts mounted on said base portion, said shafts being disposed in spaced relationship in a straight line with their axes parallel to one another, a work support mounted on each of said shafts, said work supports being in the form of pinions and each being adapted to support at least one blank to be toothed, at least one drive shaft mounted in said base portion, a gear wheel mounted on each drive shaft and arranged to mesh with said pinions, the axis of each work support shaft being spaced a shorter distance from the edge of the device to be placed adjacent a cutter than each drive shaft, whereby each drive shaft may be used as a support when cutting the teeth on a blank of large diameter.

In testimony whereof I affixed my signature.

EMIL LÄSSER.